United States Patent
Miyamoto

(10) Patent No.: US 12,243,217 B2
(45) Date of Patent: Mar. 4, 2025

(54) DATA INPUT DEVICE AND STORAGE MEDIUM FOR STORING INSTRUCTIONS

(71) Applicant: Konica Minolta, Inc., Tokyo (JP)

(72) Inventor: Hiroyuki Miyamoto, Nara (JP)

(73) Assignee: Konica Minolta, Inc., Tokyo (JP)

(\*) Notice: Subject to any disclaimer, the term of this patent is extended or adjusted under 35 U.S.C. 154(b) by 364 days.

(21) Appl. No.: 17/777,835

(22) PCT Filed: Dec. 10, 2019

(86) PCT No.: PCT/JP2019/048311
§ 371 (c)(1),
(2) Date: May 18, 2022

(87) PCT Pub. No.: WO2021/117138
PCT Pub. Date: Jun. 17, 2021

(65) Prior Publication Data
US 2022/0375065 A1  Nov. 24, 2022

(51) Int. Cl.
G06T 7/00 (2017.01)
G06T 3/40 (2024.01)
G06T 7/38 (2017.01)
G06T 7/70 (2017.01)

(52) U.S. Cl.
CPC .............. *G06T 7/0004* (2013.01); *G06T 3/40* (2013.01); *G06T 7/38* (2017.01); *G06T 7/70* (2017.01); *G06T 2207/10048* (2013.01)

(58) Field of Classification Search
CPC ........... G06T 7/0004; G06T 7/38; G06T 7/70; G06T 3/40; G06T 2207/10048
See application file for complete search history.

(56) References Cited

U.S. PATENT DOCUMENTS

| 8,386,164 B1 | 2/2013 | Moses | |
| 2020/0059624 A1* | 2/2020 | Hirata | H04N 23/45 |

FOREIGN PATENT DOCUMENTS

| EP | 3 115 944 A1 * | 11/2017 | ............. G06Q 10/06 |
| JP | 2005043157 A * | 2/2005 | ............. G01C 21/00 |
| JP | 2014-149656 A | 8/2014 | |
| JP | 6558791 B1 | 8/2019 | |

OTHER PUBLICATIONS

International Search Report issued in corresponding International Application No. PCT/JP2019/048311 mailed Feb. 18, 2020 (6 pages).
Written Opinion issued in corresponding International Application No. PCT/JP2019/04831 mailed Feb. 18, 2020 (8 pages).

\* cited by examiner

*Primary Examiner* — David F Dunphy
(74) *Attorney, Agent, or Firm* — Osha Bergman Watanabe & Burton LLP

(57) ABSTRACT

A data input device includes: a controller that: acquires position data indicating position coordinates of a facility, estimates, based on the position data, one or more facility candidates, and causes a display to display an input screen showing the estimated one or more facility candidates as options for selection by a user, and creates inspection data relating to gas inspection of the one or more facility candidates selected by the user.

20 Claims, 13 Drawing Sheets

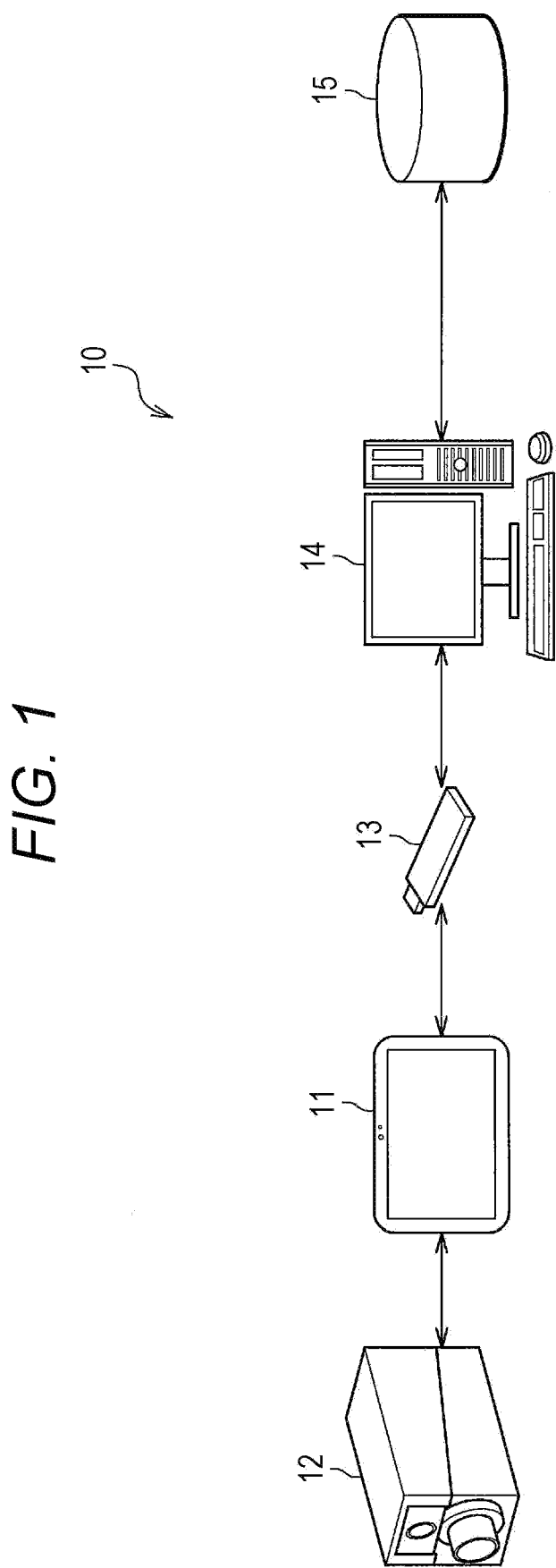

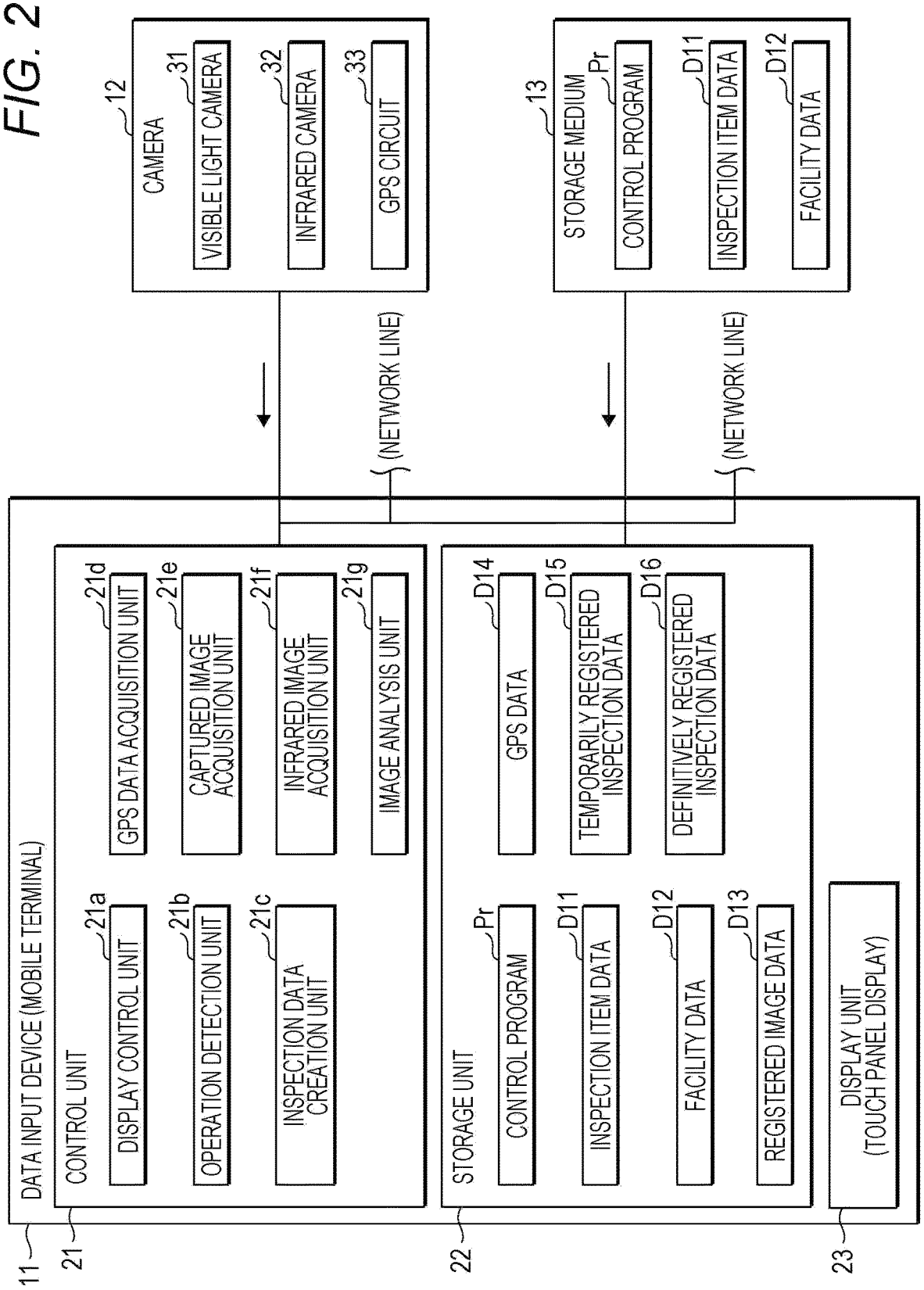

| DATE | INSPECTOR NAME | FACILITY NAME | EQUIPMENT NAME | COMPONENT NAME | IMAGE CAPTURING DISTANCE | INITIAL INSPECTION/ REINSPECTION | PRESENCE OR ABSENCE OF LEAK | INSPECTION COMPLETED/ INCOMPLETE |
|---|---|---|---|---|---|---|---|---|
| REQUIRED | REQUIRED | RECOMMENDED | RECOMMENDED | RECOMMENDED | REQUIRED | RECOMMENDED | RECOMMENDED | RECOMMENDED |

| POSITION COORDINATES | FACILITY NAME | EQUIPMENT NAME | COMPONENT NAME | REGISTERED IMAGE | IMAGE CAPTURING DISTANCE |
|---|---|---|---|---|---|
| (xxx,xxx) | North1 | Tank1 | Value1 | A01A01A01 | 40m |
| | | | Value2 | A01A01A02 | 40m |
| | | Tank2 | Value1 | A01A02A01 | 40m |
| | | | Value2 | A01A02A02 | 40m |
| | | Tank3 | Value1 | A01A03A01 | 40m |
| ⋮ | ⋮ | ⋮ | ⋮ | ⋮ | ⋮ |

| DATE | INSPECTOR NAME | FACILITY NAME | EQUIPMENT NAME | COMPONENT NAME | CAPTURED IMAGE | IMAGE CAPTURING DISTANCE | INFRARED IMAGE | ANALYSIS IMAGE | INITIAL INSPECTION/ REINSPECTION | PRESENCE OR ABSENCE OF LEAK | INSPECTION COMPLETED/ INCOMPLETE |
|---|---|---|---|---|---|---|---|---|---|---|---|
| 20190401 | ○○○○ | North1 | Tank1 | Value1 | A11 | 40m | B11 | C11 | INITIAL INSPECTION | — | — |
| 20190401 | ○○○○ | North1 | Tank1 | Value2 | A12 | 40m | B12 | C12 | INITIAL INSPECTION | — | — |
| 20190401 | ○○○○ | North1 | Tank2 | Value1 | A21 | 50m | B21 | C21 | INITIAL INSPECTION | — | — |
| ⋮ | ⋮ | ⋮ | ⋮ | ⋮ | ⋮ | ⋮ | ⋮ | ⋮ | ⋮ | ⋮ | ⋮ |

| DATE | INSPECTOR NAME | FACILITY NAME | EQUIPMENT NAME | COMPONENT NAME | CAPTURED IMAGE | IMAGE CAPTURING DISTANCE | INFRARED IMAGE | ANALYSIS IMAGE | INITIAL INSPECTION/ REINSPECTION | PRESENCE OR ABSENCE OF LEAK | INSPECTION COMPLETED/ INCOMPLETE |
|---|---|---|---|---|---|---|---|---|---|---|---|
| 20190401 | ○○○○ | North1 | Tank1 | Value1 | A11 | 40m | B11 | C11 | INITIAL INSPECTION | PRESENT | INCOMPLETE |
| 20190401 | ○○○○ | North1 | Tank1 | Value2 | A12 | 40m | B12 | C12 | INITIAL INSPECTION | ABSENT | COMPLETED |
| 20190401 | ○○○○ | North1 | Tank2 | Value1 | A21 | 50m | B21 | C21 | INITIAL INSPECTION | PRESENT | INCOMPLETE |
| ⋮ | ⋮ | ⋮ | ⋮ | ⋮ | ⋮ | ⋮ | ⋮ | ⋮ | ⋮ | ⋮ | ⋮ |

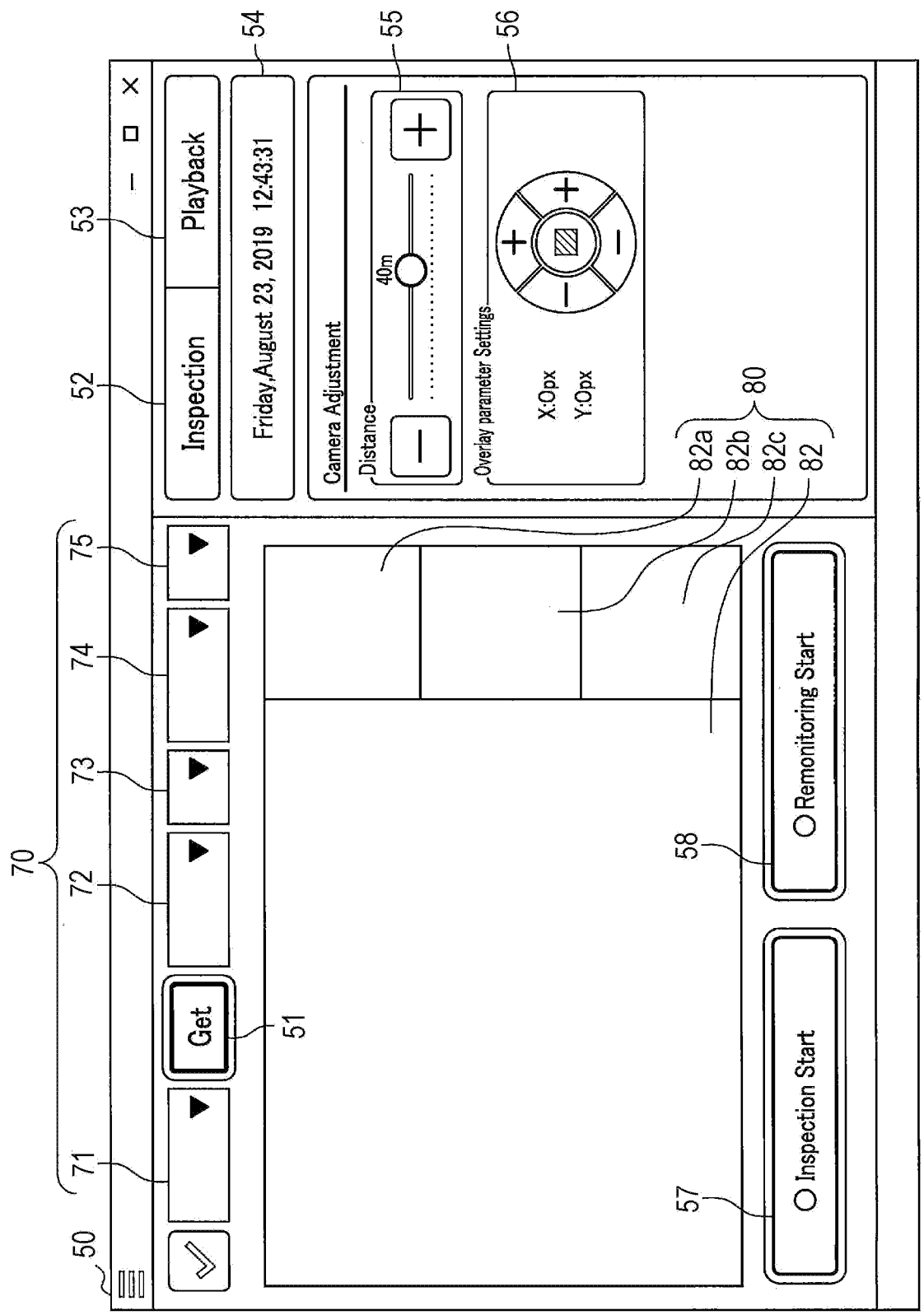

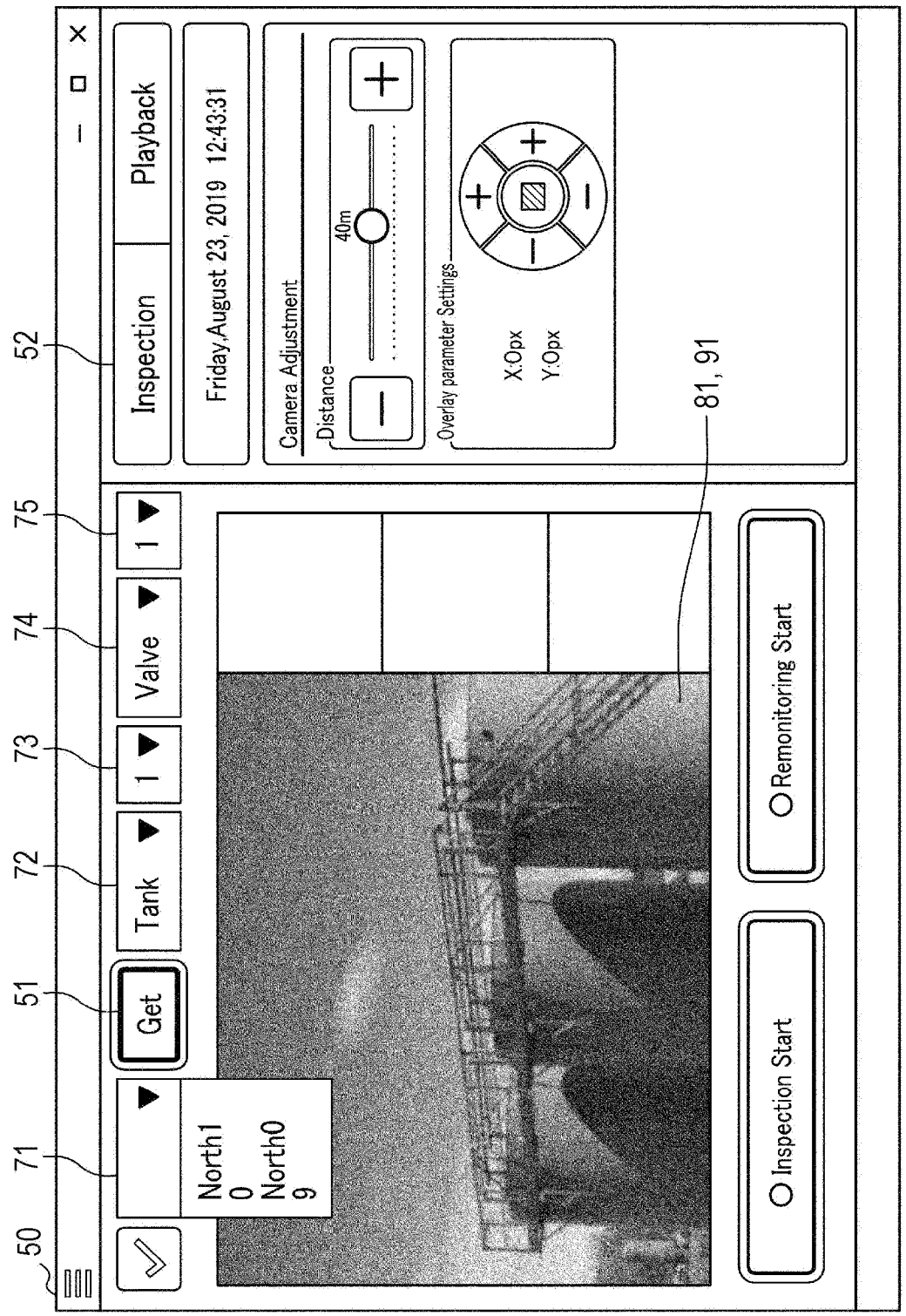

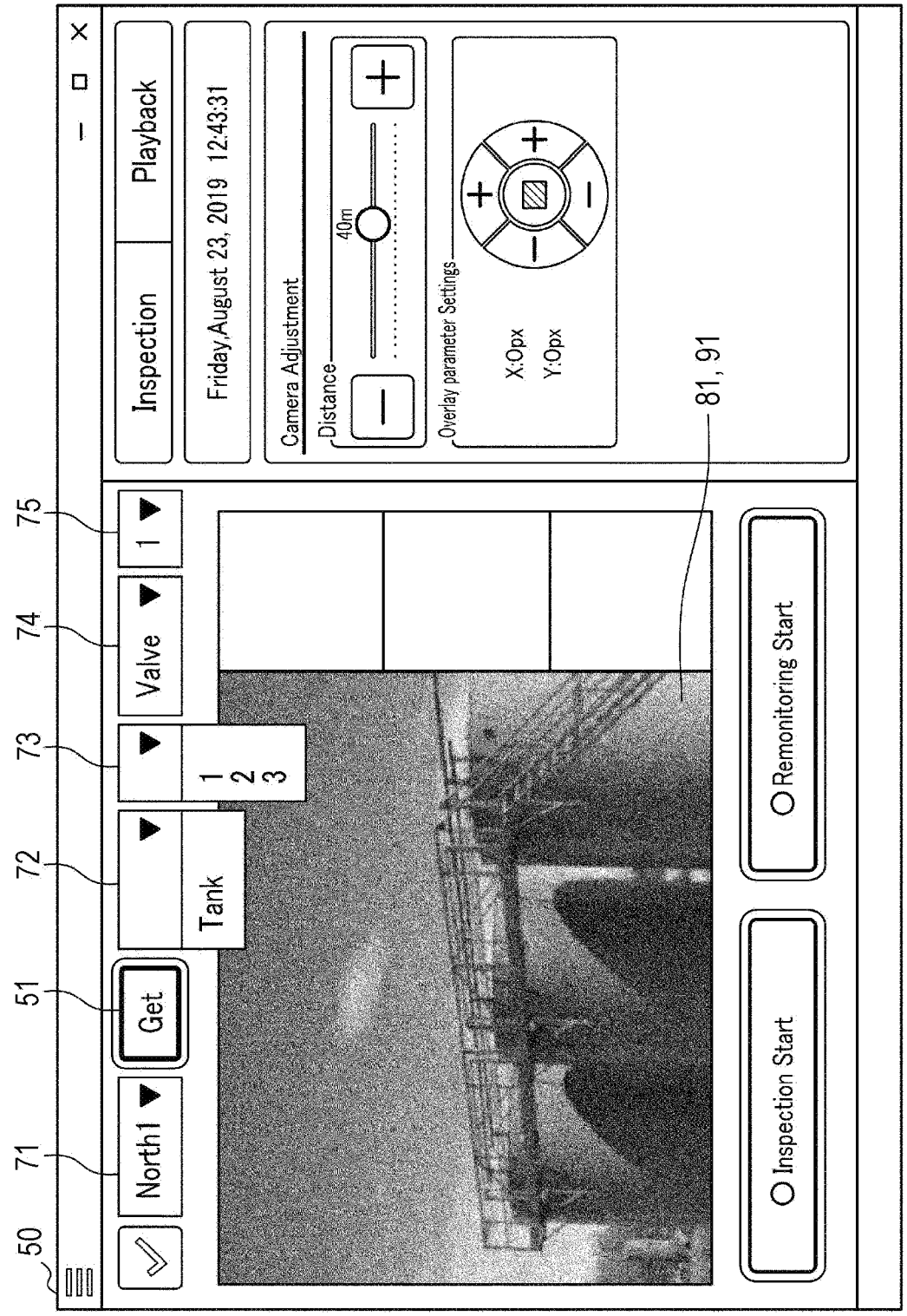

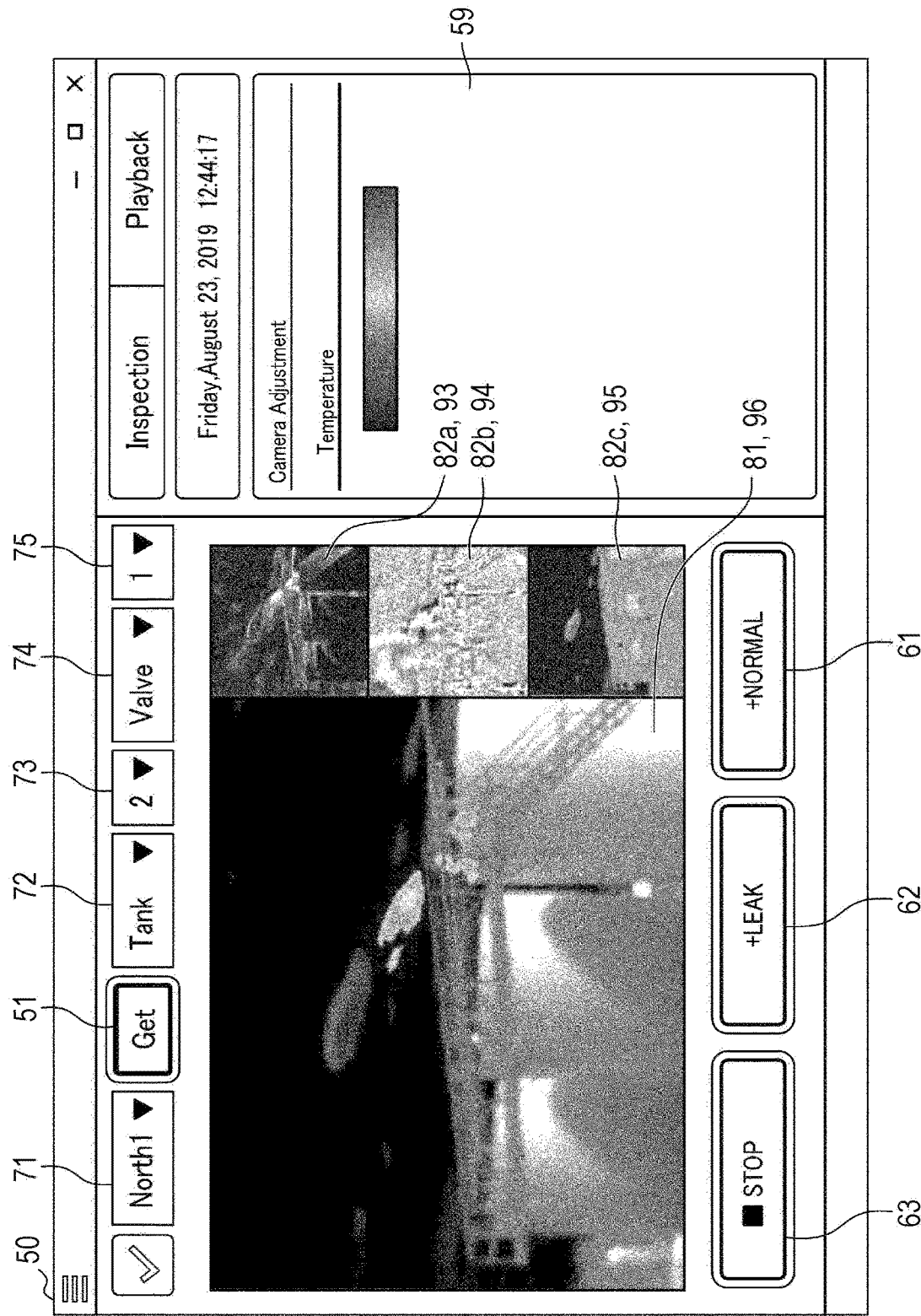

DATA INPUT DEVICE AND STORAGE MEDIUM FOR STORING INSTRUCTIONS

BACKGROUND

Technical Field

The present invention relates to a data input device and a storage medium for storing instructions.

Description of Related Art

For example, equipment of facilities that handle oil, natural gas, and the like includes an oil well that collects crude oil and gas from an oil layer, a pipeline that transports the collected oil and gas, a tank that stores oil and gas, a pipe that distributes oil and gas from the tank, a valve that opens and closes the pipe, and the like. In these facilities, in particular, in order to prevent gas leak accidents, workers routinely go around their facilities in various places to inspect the presence or absence of gas leak and create inspection records (inspection forms). Then, in a case where a gas leak has occurred, a worker arranges another worker to repair the gas leak site. When another worker repairs the gas leak site, the worker reinspects the presence or absence of gas leak and confirms that there is no gas leak.

As a system for supporting such an inspection, for example, there is a system described in Patent Literature 1. Patent Literature 1 discloses a technique that, when a global positioning system (GPS) is used to reach a leak detection and repair (LDAR) component (inspection target) in a gas leak inspection, acquires position coordinates of a handheld computer and registers the position coordinates as position coordinates of the LDAR component. In addition, Patent Literature 1 also describes a technique of acquiring a distance, a direction, and the like for traveling toward the LDAR component on the basis of position coordinates of the handheld computer acquired by the GPS and position coordinates of the LDAR component registered in advance in order for an operator to easily find the LDAR component in the field.

Patent Literature

Patent Literature 1: U.S. Pat No. 8,386,164

SUMMARY

The number of facilities that handle oil, natural gas, and the like is relatively large and scattered in various places. Thus, the worker has to bear a large burden when inspecting each facility for the presence or absence of gas leak and creating an inspection record (inspection form). In particular, when creating the inspection record (inspection form), data of various inspection items is input to an input screen of a data input device, but the data input work takes a lot of time and effort. For example, when inputting a facility name, the worker specifies the facility name from the current position coordinates, and inputs the corresponding facility name letter by letter on the input screen of the data input device. Further, various types of equipment and components are arranged in the facility, and when inputting an equipment name and a component name, similarly, the worker specifies the equipment name and the component name from the current position coordinates and inputs the corresponding facility name and component name letter by letter on the input screen of the data input device. Thus, it has been demanded for the data input device to reduce the burden on the operator when inputting data for creating the inspection record (inspection form).

However, the prior art technique described in Patent Literature 1 does not consider reducing the burden on the operator when inputting data for creating the inspection record (inspection form). Thus, the prior art technique described in Patent Literature 1 has a problem that the burden is imposed on the operator when inputting data.

One or more embodiments of the present invention provide a data input device that reduces the burden on an operator when inputting data, and a storage medium that stores instructions.

One or more embodiments of the present invention are provided by the followings.

(1) A data input device including a display control unit that creates various screens and displays the screens on a display unit, an inspection data creation unit that creates inspection data related to a gas inspection in a facility of either one or both of oil and gas, and a position data acquisition unit that acquires position data indicating position coordinates of the facility, in which the display control unit creates an input screen for creating the inspection data, and the inspection data creation unit estimates, on the basis of the position data, one or a plurality of facility candidates for which the inspection data is to be created, and displays the facility candidate or candidates as option(s) for selection on the input screen.

(2) The data input device according to above (1), in which the inspection data creation unit estimates one or a plurality of facility candidates existing near position coordinates indicated by the position data, and displays the facility candidates as options for selection on the input screen in order of proximity to the position coordinates.

(3) The data input device according to above (1), further including a captured image acquisition unit that acquires a captured image in which the facility is captured, in which the display control unit creates, as the input screen, a screen including a first input field for inputting the facility candidate, a second input field for inputting an equipment candidate provided in the facility candidate, and a third input field for inputting a component candidate provided in the equipment candidate, and the inspection data creation unit estimates, on the basis of facility data prepared in advance, one or a plurality of the equipment candidates provided in each facility candidate and one or a plurality of the component candidates provided in each equipment candidate, and displays, as options for selection, each facility candidate, each equipment candidate, and each component candidate in the first input field, the second input field, and the third input field corresponding thereto, respectively.

(4) The data input device according to above (3), in which the inspection data creation unit estimates the component candidate by comparing a registered image acquired in past with the captured image.

(5) The data input device according to above (3), further including an infrared image acquisition unit that acquires an infrared image of the facility, and an image analysis unit that creates an analysis image obtained by analyzing a situation of the facility on the basis of the infrared image, in which the inspection data creation unit displays the captured image, the infrared image, and the analysis image on the input screen.

(6) The data input device according to above (5), in which the display control unit creates, as the input screen, a screen including a plurality of reduced display fields in which reduced images are displayed and at least one enlarged display field in which an enlarged image is displayed, displays the captured image, the infrared image, and the analysis image in the reduced display fields, respectively, and displays an image freely selected from among the images displayed in the respective reduced display fields in the enlarged display field.

(7) The data input device according to above (5), in which the display control unit creates, as the input screen, a screen including a first inspection start button for an initial inspection and a second inspection start button for a reinspection as inspection start buttons that instruct start of an inspection accompanied by creation of the analysis image.

(8) The data input device according to above (7), in which when either one of the first inspection start button and the second inspection start button is pressed, the display control unit displays a first end button that is pressed when an abnormality is not present in the facility and a second end button that is pressed when an abnormality is present in the facility on the input screen at any timing, and when at least the second end button is pressed, the inspection data creation unit stores any one or a plurality of images among the captured image, the infrared image, and the analysis image in a storage unit in association with the inspection data.

(9) The data input device according to above (3), in which the display control unit creates, as the input screen, a screen including a distance setting operation field for performing an operation of setting an image capturing distance.

(10) The data input device according to above (5), in which the display control unit creates, as the input screen, a screen including a position adjustment operation field for performing an adjustment operation of a position where the captured image and the infrared image are overlaid.

(11) A storage medium for storing instructions causing a computer to function as a display control unit that creates various screens and displays the screens on a display unit, an inspection data creation unit that creates inspection data related to a gas inspection in a facility of either one or both of oil and gas, and a position data acquisition unit that acquires position data indicating position coordinates of the facility, in which the instructions further cause the display control unit to create an input screen for creating the inspection data, and the inspection data creation unit to estimate, on the basis of the position data, one or a plurality of facility candidates for which the inspection data is to be created, and to display the facility candidate or candidates as option(s) for selection on the input screen.

(12) The storage medium according to above (11) for storing the instructions, in which the instructions cause the inspection data creation unit to estimate one or a plurality of facility candidates existing near position coordinates indicated by the position data, and to display the facility candidates as options for selection on the input screen in order of proximity to the position coordinates.

(13) The storage medium according to above (11) for storing the instructions further causing the computer to function as a captured image acquisition unit that acquires a captured image in which the facility is captured, in which the instructions cause the display control unit to create, as the input screen, a screen including a first input field for inputting the facility candidate, a second input field for inputting an equipment candidate provided in the facility candidate, and a third input field for inputting a component candidate provided in the equipment candidate, and the inspection data creation unit to estimate, on the basis of facility data prepared in advance, one or a plurality of the equipment candidates provided in each facility candidate and one or a plurality of the component candidates provided in each equipment candidate, and to display, as options for selection, each facility candidate, each equipment candidate, and each component candidate in the first input field, the second input field, and the third input field corresponding thereto, respectively.

(14) The storage medium according to above (13) for storing the instructions, in which the instructions cause the inspection data creation unit to estimate the component candidate by comparing a registered image acquired in past with the captured image.

(15) The storage medium according to above (13) for storing the instructions further causing the computer to function as an infrared image acquisition unit that acquires an infrared image of the facility, and an image analysis unit that creates an analysis image obtained by analyzing a situation of the facility on the basis of the infrared image, in which the inspection data creation unit displays the captured image, the infrared image, and the analysis image on the input screen.

(16) The storage medium according to above (15) for storing the instructions, in which the instructions cause the display control unit to create, as the input screen, a screen including a plurality of reduced display fields in which reduced images are displayed and at least one enlarged display field in which an enlarged image is displayed, display the captured image, the infrared image, and the analysis image in the reduced display fields, respectively, and display an image freely selected from among the images displayed in the respective reduced display fields in the enlarged display field.

(17) The storage medium according to above (15) for storing the instructions, in which the instructions cause the display control unit to create, as the input screen, a screen including a first inspection start button for an initial inspection and a second inspection start button for a reinspection as inspection start buttons that instruct start of an inspection accompanied by creation of the analysis image.

(18) The storage medium according to above (17) for storing the instructions, in which the instructions cause, when either one of the first inspection start button and the second inspection start button is pressed, the display control unit to display a first end button that is pressed when an abnormality is not present in the facility and a second end button that is pressed when an abnormality is present in the facility on the input screen at any timing, and causes, when at least the second end button is pressed, the inspection data creation unit to store any one or a plurality of images among the captured image, the infrared image, and the analysis image in a storage unit in association with the inspection data.

(19) The storage medium according to above (13) for storing the instructions, in which the instructions cause the display control unit to create, as the input screen, a screen including a distance setting operation field for performing an operation of setting an image capturing distance.

(20) The storage medium according to above (15) for storing the instructions, in which the instructions cause, the display control unit to create, as the input screen, a screen including a position adjustment operation field for performing an adjustment operation of a position where the captured image and the infrared image are overlaid.

According to one or more embodiments of the present invention, it is possible to reduce a burden on an operator when inputting data.

BRIEF DESCRIPTION OF THE DRAWINGS

FIG. 1 is a schematic diagram illustrating a configuration of a data input system including a data input device according to one or more embodiments.

FIG. 2 is a block diagram illustrating a configuration of the data input device according to one or more embodiments.

FIG. 3 is an explanatory diagram illustrating a configuration of inspection item data.

FIG. 4 is an explanatory diagram illustrating a configuration of facility data.

FIG. 5A is an explanatory diagram illustrating a configuration of temporarily registered inspection data.

FIG. 5B is an explanatory diagram illustrating a configuration of definitively registered inspection data.

FIG. 7A is an explanatory diagram (1) illustrating a configuration of an input screen.

FIG. 7B is an explanatory diagram (2) illustrating a configuration of the input screen.

FIG. 7C is an explanatory diagram (3) illustrating a configuration of the input screen.

FIG. 7G is an explanatory diagram (7) illustrating a configuration of the input screen.

DETAILED DESCRIPTION OF THE EMBODIMENTS

Figure 6A:
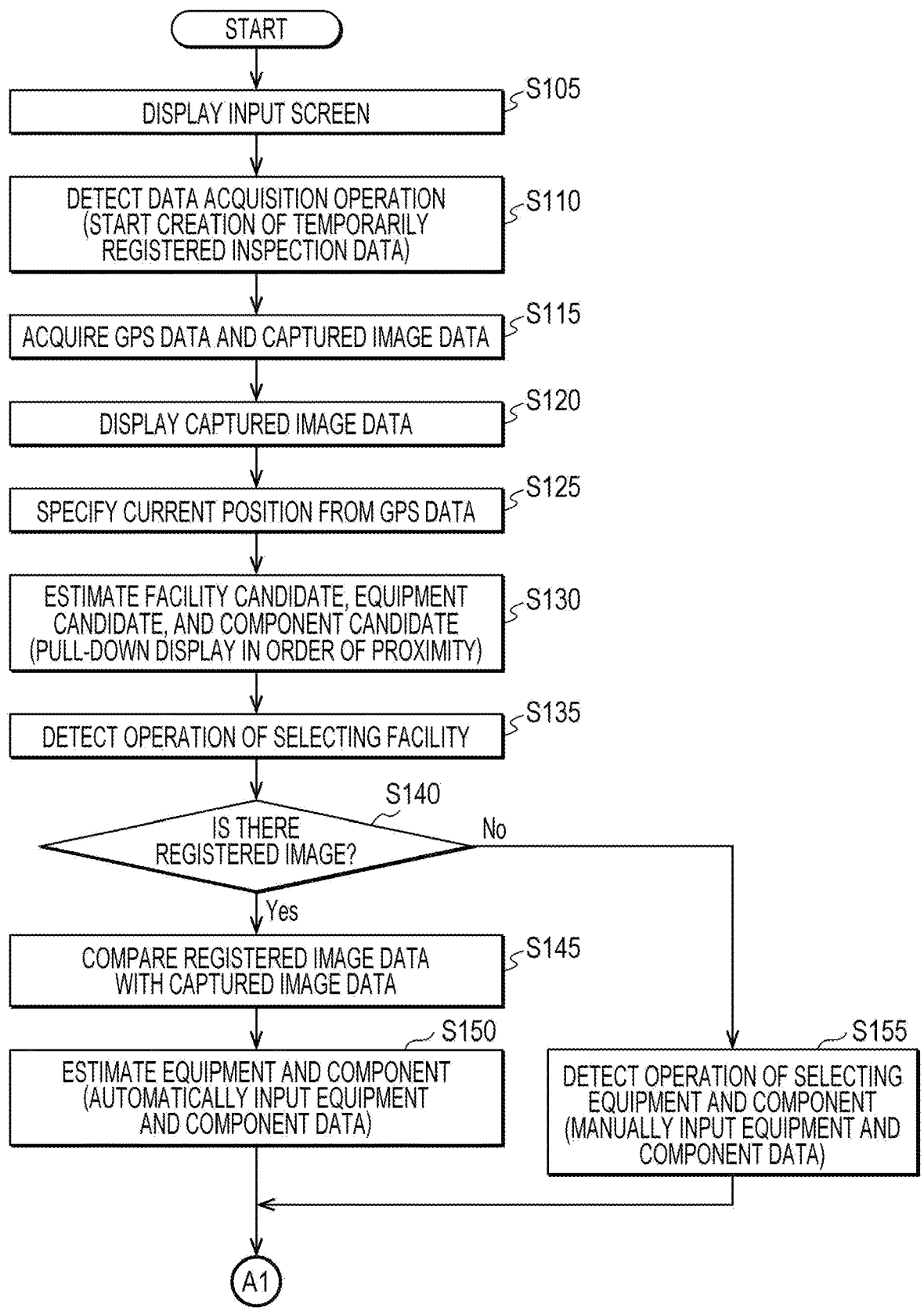
FIG. 6A is a flowchart (1) illustrating an operation of the data input device.

Hereinafter, embodiments of the present invention will be described in detail with reference to the drawings. Note that the drawings are only schematically illustrated to the extent that the present invention can be sufficiently understood. Therefore, the present invention is not limited only to illustrated examples. Further, in the drawings, the same reference numerals are given to common components and similar components, and redundant description thereof will be omitted.

<Configuration of Data Input Device and Data Input System>

Hereinafter, configurations of a data input device 11 and a data input system 10 implemented by the data input device 11 according to one or more embodiments of the present invention will be described with reference to FIGS. 1 and 2. FIG. 1 is a diagram illustrating a configuration of the data input system 10 including the data input device 11 according to one or more embodiments. FIG. 2 is a block diagram mainly illustrating a configuration of the data input device 11 according to one or more embodiments.

As illustrated in FIG. 1, the data input system 10 includes the data input device 11, a camera 12, a universal serial bus (USB) memory 13, a support terminal 14, and a data server 15.

The data input device 11 is operated by an operator (worker) to input data of various inspection items. In one or more embodiments, it will be described assuming that the data input device 11 is formed by a portable terminal such as a tablet device, a notebook personal computer, or a smartphone.

The camera 12 is a device that captures an image of an inspection location. In one or more embodiments, the camera 12 has a function of acquiring a color captured image (a visible light image, in particular, a visible light moving image), an infrared image (in particular, an infrared moving image), and GPS data (position data).

The USB memory 13 is a portable storage medium that stores various control instructions (programs) and data. In one or more embodiments, it will be described assuming a case where the storage medium is formed by the USB memory 13. However, the storage medium can be formed by, for example, a semiconductor memory other than a USB memory, an HDD device, an optical medium such as a CD-ROM or a DVD, a magnetic medium such as a flexible disk, or other forms.

The support terminal 14 is a device that performs providing various control instructions and data to the data input device 11, transferring the inspection record (inspection form) from the data input device 11 to the data server 15, and the like. The support terminal 14 can read the inspection record (inspection form) from the data server 15, edit the inspection record (inspection form) into a predetermined format, and print the inspection record (inspection form) on paper by a printer that is not illustrated. Note that, in one or more embodiments, it will be described assuming that definitively registered inspection data D16 (see FIG. 2) to be described later corresponds to the inspection record (inspection form).

The data server 15 is a server that stores various data. In one or more embodiments, the data server 15 stores the definitively registered inspection data D16 (see FIG. 2) to be described later as the inspection record (inspection form).

The data input device 11 is communicably connected to the camera 12 via, for example, a communication cable or wirelessly. Further, the data input device 11 is communicably connected to the USB memory 13 by inserting the USB memory 13 into a USB port provided therein. As in the data input device 11, the support terminal 14 is communicably connected to the USB memory 13 by inserting the USB memory 13 into a USB port provided therein. The data input device 11 and the support terminal 14 indirectly transmit and receive various instructions and data via the USB memory 13. However, the data input device 11 and the support terminal 14 may directly transmit and receive various instructions and data via a communication line. The support terminal 14 is communicably connected to the data server 15 via a communication line.

As illustrated in FIG. 2, the data input device 11 includes a control unit ("controller") 21, a storage unit ("storage") 22, and a display unit ("display") 23.

The control unit 21 is a means that intensively controls each unit of the data input device 11. The control unit 21 includes a microcomputer or the like. By executing control instructions (a program) Pr stored in the storage unit 22, the microcomputer constituting the control unit 21 functions as a display control unit 21a, an operation detection unit 21b, an inspection data creation unit 21c, a GPS data acquisition unit 21d, a captured image acquisition unit 21e, an infrared image acquisition unit 21f, and an image analysis unit 21g.

The display control unit 21a is a means that controls display on the display unit 23. The display control unit 21a creates various screens and displays the screens on the display unit 23.

The operation detection unit 21b is a means that detects an operation of an operator (worker).

The inspection data creation unit 21c is a means that creates inspection data (temporarily registered inspection data D15 and the definitively registered inspection data D16 to be described later) related to a facility.

The GPS data acquisition unit 21d is a means (position data acquisition unit) that acquires GPS data D14 (position data) to be described later from the camera 12. However, by incorporating a GPS circuit in the data input device 11, the GPS data acquisition unit 21d can also acquire GPS data (position data) indicating position coordinates of its own current location point from a GPS satellite using the GPS circuit.

The captured image acquisition unit 21e is a means that acquires a captured image 91 (see FIGS. 7B to 7F) from the camera 12. In the captured image 91, a facility (in particular, a component of the facility to be inspected) is captured. In one or more embodiments, it will be described assuming that the captured image 91 is a moving image.

The infrared image acquisition unit 21f is a means that acquires an infrared image 92 (see FIG. 7F) from the camera 12. In the infrared image 92, infrared rays radiated from the facility (in particular, the component of the facility to be inspected) are captured. In one or more embodiments, it will be described assuming that the infrared image 92 is a moving image.

The image analysis unit 21g is a means that creates an analysis image obtained by analyzing a situation of the facility (in particular, the component of the facility to be inspected) on the basis of an infrared image acquired from the camera 12. Note that the image analysis unit 21g can create an analysis image on the basis of not only the infrared image but also both the infrared image and the captured image (visible light image).

In one or more embodiments, it will be described assuming that the image analysis unit 21g creates, for example, an intermediate image 93, a temperature image 94, an infrared-gas cloud superimposed image 95, and a visible light-gas cloud superimposed image 96 each illustrated in FIG. 7G as analysis images. Note that the image analysis unit 21g may further create a high-sensitivity intermediate image (not illustrated) obtained by increasing sensitivity of the intermediate image 93.

The intermediate image 93 (see FIG. 7G) is an image obtained by visualizing a temperature change due to gas fluctuation, and is an image obtained by extracting gas cloud candidates.

The temperature image 94 (see FIG. 7G) is a colorized image obtained by converting a luminance value obtained from the infrared image into a temperature value.

The infrared-gas cloud superimposed image 95 (see FIG. 7G) is an image in which a gas region extracted by performing image processing on the intermediate image 93 is superimposed on the infrared image.

The visible light-gas cloud superimposed image 96 (see FIG. 7G) is an image in which a gas region extracted by performing image processing on the intermediate image 93 is superimposed on the captured image (visible light image).

In one or more embodiments, it will be described assuming that the analysis images (in the example illustrated in FIG. 7G, the intermediate image 93, the temperature image 94, the infrared-gas cloud superimposed image 95, and the visible light-gas cloud superimposed image 96) are moving images.

The storage unit 22 stores the control instructions Pr, inspection item data D11, facility data D12, registered image data D13, the GPS data D14, the temporarily registered inspection data D15, and the definitively registered inspection data D16.

The control instructions Pr are instructions that cause the microcomputer constituting the control unit 21 to execute a predetermined operation.

The inspection item data D11 is data specifying an inspection item.

The facility data D12 is data related to each facility to be inspected.

The registered image data D13 is the captured image (visible light image) of a facility acquired in the past.

The GPS data D14 is position data indicating position coordinates of the camera 12 acquired by the GPS data acquisition unit 21d. The GPS data D14 indicates the position of the camera 12 by longitude and latitude. Note that since the camera 12 captures an image of a facility in the vicinity of the facility, the position coordinates of the camera 12 are substantially the same as position coordinates of the facility.

The temporarily registered inspection data D15 is inspection data of a temporarily registered facility.

The definitively registered inspection data D16 is inspection data of a facility that is registered definitively. The definitively registered inspection data D16 is obtained by definitively registering the temporarily registered inspection data D15.

Details of the inspection item data D11, the facility data D12, the temporarily registered inspection data D15, and the definitively registered inspection data D16 will be described later.

The display unit 23 includes, for example, a touch panel display, and also serves as an input unit. The display unit 23 displays, for example, a login screen (not illustrated), an input screen 50 (see FIGS. 7A to 7G), and the like.

The camera 12 connected to the data input device 11 is configured as a unit including a visible light camera 31, an infrared camera 32, and a GPS circuit 33.

The visible light camera 31 is a means that acquires the captured image (visible light image) of the facility.

The infrared camera 32 is a means that acquires an infrared image of the facility. The infrared camera 32 is arranged near the visible light camera 31 and captures an image of the same object as the visible light camera 31.

The GPS circuit 33 is a circuit that acquires the GPS data D14 indicating the position coordinates of the current location point from the GPS satellite.

The data input device 11 acquires the captured image, the infrared image, and the GPS data D14 from the camera 12.

The USB memory 13 inserted into the USB port (not illustrated) of the data input device 11 stores the control instructions Pr, the inspection item data D11, and the facility data D12 each described above. The data input device 11 acquires the control instructions Pr, the inspection item data D11, and the facility data D12 from the USB memory 13, and stores them in the storage unit 22.

<Configuration of Main Data>

Hereinafter, a configuration of main data will be described with reference to FIGS. 3 to 5B. FIG. 3 is an explanatory diagram illustrating a configuration of the inspection item data D11. FIG. 4 is an explanatory diagram illustrating a configuration of the facility data D12. FIG. 5A is an explanatory diagram illustrating a configuration of the temporarily registered inspection data D15. FIG. 5B is an explanatory diagram illustrating a configuration of the definitively registered inspection data D16.

In the example illustrated in FIG. 3, the inspection item data D11 includes a "date" field, an "inspectors name" field, a "facility name" field, an "equipment name" field, an "image capturing distance" field, an "initial inspection/reinspection" field, a "presence or absence of leak" field, and an "inspection completed/incomplete" field.

The "date" field is a field for registering date data. The "date" field may include hour, minute, and second data.

The "inspector name" field is a field for registering an inspector name.

The "facility name" field is a field for registering a facility name.

The "equipment name" field is a field for registering an equipment name.

The "image capturing distance" field is a field for registering an image capturing distance from the camera 12 to the facility (in particular, the component of the facility to be inspected).

The "initial inspection/reinspection" field is a field for registering data indicating whether the inspection is a first-time inspection (initial inspection) or a reinspection.

The "presence or absence of leak" field is a field for registering data indicating whether or not there is a gas leak.

The "inspection completed/incomplete" field is a field for registering data indicating whether or not the inspection is completed.

In the example illustrated in FIG. 4, the facility data D12 includes the "position coordinates" field, the "facility name" field, the "equipment name" field, the "component name" field, a "registered image" field, and the "image capturing distance" field. Here, description of the same field as described above is omitted.

The "position coordinates" field is a field for registering data indicating the position coordinates of each facility. The "position coordinates" field may include data indicating the altitude of each facility.

The "facility name" field and the "equipment name" field are as described above.

The "component name" field is a field for registering a component name.

The "registered image" field is a field for registering data (or the registered image data D13 itself) for reading the registered image data D13 stored in the storage unit 22.

The "image capturing distance" field is a field for registering data indicating the image capturing distance of the registered image.

In the example illustrated in FIG. 5A, the temporarily registered inspection data D15 includes the "date" field, the "inspector name" field, the "facility name" field, the "equipment name" field, the "component name" field, a "captured image" field, the "image capturing distance" field, an "infrared image" field, an "analysis image" field, the "initial inspection/reinspection" field, the "presence or absence of leak" field, and the "inspection completed/incomplete" field. Here, description of the same field as described above is omitted.

The "date" field, the "inspector name" field, the "facility name" field, the "equipment name" field, and the "component name" field are as described above.

The "captured image" field is a field for registering the captured image (visible light image) of the facility acquired from the camera 12.

The "image capturing distance" field is a field for registering the image capturing distance at the time of capturing the captured image (visible light image). In the "image capturing distance" field, the image capturing distance may be registered in stages, for example, "large", "medium", "small", and the like.

The "infrared image" field is a field for registering an infrared image of the facility acquired from the camera 12.

The "analysis image" field is a field for registering the above-described analysis images (for example, the intermediate image 93, the temperature image 94, the infrared-gas cloud superimposed image 95, the visible light-gas cloud superimposed image 96, and the like each illustrated in FIG. 7G).

The "initial inspection/reinspection" field, the "presence or absence of leak" field, and the "inspection completed/incomplete" field are as described above.

The definitively registered inspection data D16 illustrated in FIG. 5B is similar in configuration to the temporarily registered inspection data D15 illustrated in FIG. 5A. In the definitively registered inspection data D16, data that is blank in the "presence or absence of leak" field and the "inspection completed/incomplete" field of the temporarily registered inspection data D15 is registered.

<Operation of Data Input Device>

Figure 6B:
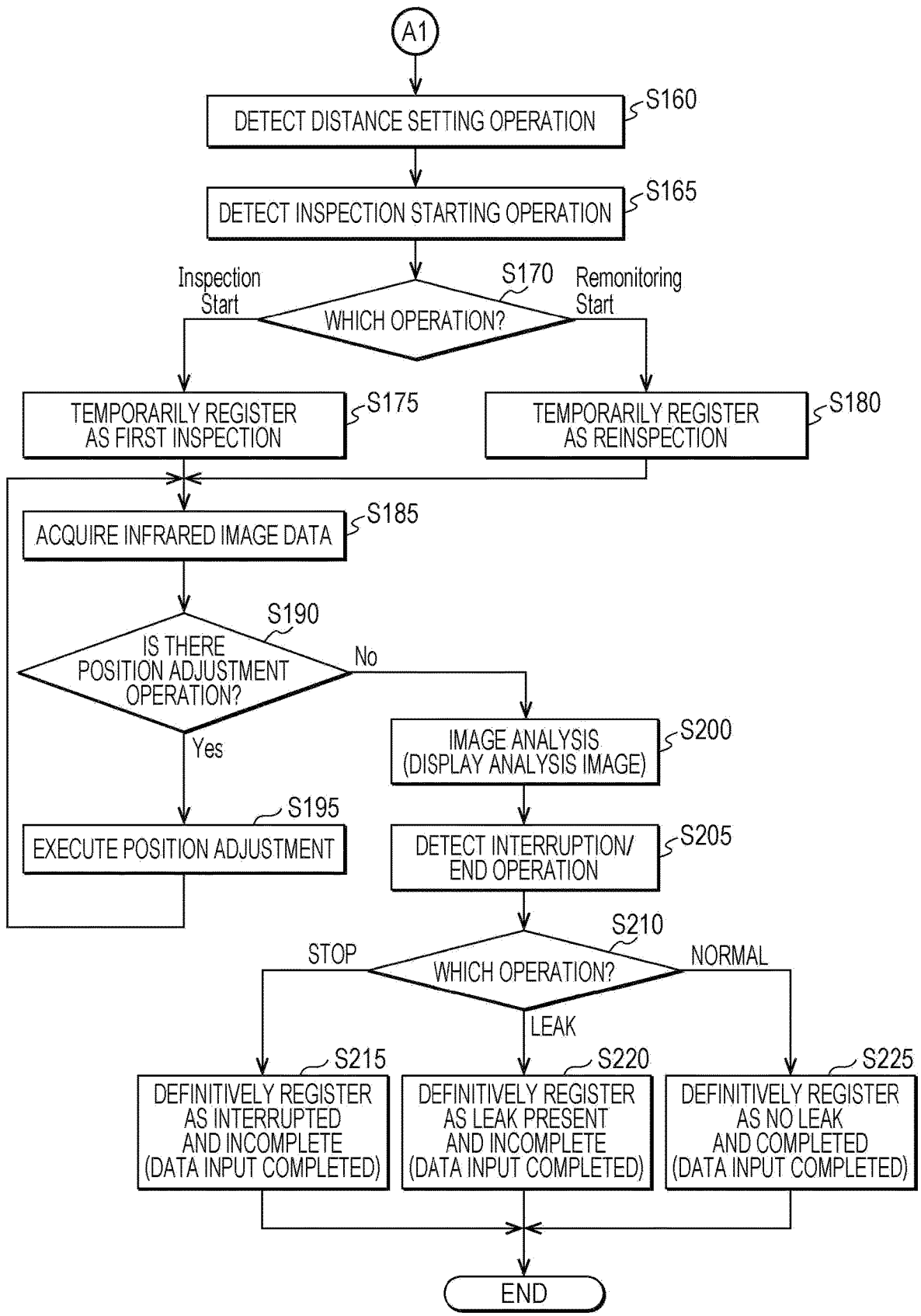
FIG. 6B is a flowchart (2) illustrating the operation of the data input device.

Hereinafter, an operation of the data input device 11 will be described with reference to FIGS. 6A to 7G. FIGS. 6A and 6B are flowcharts each illustrating the operation of the data input device 11. FIGS. 7A to 7G are explanatory diagrams each illustrating a configuration of the input screen 50.

The display control unit 21a of the data input device 11 displays the login screen (not illustrated) on the display unit 23 when the data input device 11 is activated. The operator (worker) starts application instructions of the data input device 11 by inputting an ID and a password in an identification (ID: identification number) input field and a password input field provided on the login screen (not illustrated).

Thereafter, the operator performs an operation for creating the inspection record (inspection form). In response to this, as illustrated in FIG. 6A, the display control unit 21a of the data input device 11 creates the input screen 50 (see FIG. 7A) and displays the input screen 50 on the display unit 23 (step S105).

In the example illustrated in FIG. 7A, the input screen 50 includes an acquisition button 51, an image capturing mode button 52, a reproduction mode button 53, a date display field 54, a distance setting operation field 55, a position adjustment operation field 56, a first inspection start button 57, a second inspection start button 58, an inspection location input field 70, and an image display field 80.

The acquisition button 51 is a button for instructing the data input device 11 to acquire the GPS data D14 from the camera 12.

The image capturing mode button 52 is a button for instructing the camera 12 to capture an image.

The reproduction mode button 53 is a button for instructing reproduction of a captured image captured by the camera 12.

The date display field 54 is a field in which date data is displayed. The inspection data creation unit 21c automatically inputs date data acquired from a timer (not illustrated) to the date display field 54.

The distance setting operation field 55 is a button for performing an operation of setting the image capturing distance. In a state immediately after the input screen 50 is displayed on the display unit 23, the image capturing distance is set to a default value ("40 m" in the illustrated example).

The position adjustment operation field 56 is a button for performing an adjustment operation of a position where the captured image 91 (see FIG. 7F) to be described later and the infrared image 92 (see FIG. 7F) to be described later are overlaid.

The first inspection start button 57 is a button for instructing the data input device 11 to start the initial inspection.

The second inspection start button 58 is a button for instructing the data input device 11 to start the reinspection.

The inspection location input field 70 is a field for inputting the inspection location. In the example illustrated in FIG. 7A, the inspection location input field 70 includes a facility input field 71 (first input field), an equipment input field 72 (second input field), an equipment detail input field 73, a component input field 74 (third input field), and a component detail input field 75.

The facility input field 71 (first input field) is a field for inputting a facility candidate.

The equipment input field 72 (second input field) is a field for inputting an equipment candidate provided in the facility candidate.

The equipment detail input field 73 is a field for inputting details of the equipment candidate.

The component input field 74 (third input field) is a field for inputting a component candidate provided in the equipment candidate.

The component detail input field 75 is a field for inputting details of the component candidate.

The image display field 80 is a field for displaying various images. In the example illustrated in FIG. 7A, the image display field 80 includes an enlarged display field 81 and reduced display fields 82a, 82b, and 82c.

The enlarged display field 81 is a field in which an enlarged image is displayed.

The reduced display fields 82a, 82b, and 82c are fields in which reduced images are displayed.

The display control unit 21a can display the captured image 91 (see FIG. 7F) to be described later, the infrared image 92 (see FIG. 7F) to be described later, and the above-described analysis images in the reduced display fields 82a, 82b, and 82c, respectively. Further, the display control unit 21a can display an image freely selected from among the images displayed in the respective reduced display fields 82a, 82b, and 82c in the enlarged display field 81. In addition, the display control unit 21a can exchange and display the image displayed in any of the reduced display fields 82a, 82b, and 82c and the image displayed in the enlarged display field 81.

Note that the example illustrated in FIG. 7A is merely an example, and the input screen 50 can be changed as needed according to the operation. For example, the input screen 50 can be changed to a configuration in which the number of enlarged display fields 81 or reduced display fields 82a, 82b, and 82c is increased.

The operator who sees the input screen 50 illustrated in FIG. 7A presses the acquisition button 51 to perform a data acquisition operation. Returning to FIG. 6A, after step S105, the operation detection unit 21b of the data input device 11 detects the data acquisition operation (that is, a pressing operation on the acquisition button 51) by the operator. Then, the inspection data creation unit 21c starts creation of the temporarily registered inspection data D15 (see FIG. 5A) (step S110).

At this time, the inspection data creation unit 21c automatically inputs the date data displayed in the date display field 54 to the "date" field of the temporarily registered inspection data D15 (see FIG. 5A). Further, the inspection data creation unit 21c specifies the operator name with the ID of the operator input on the login screen (not illustrated) at the time of activation of the data input device 11 using operator list data (not illustrated) prepared in advance, and automatically inputs the specified operator name as the inspector name in the "inspector name" field of the temporarily registered inspection data D15 (see FIG. 5A).

Next, the GPS data acquisition unit 21d and the captured image acquisition unit 21e of the data input device 11 acquire the GPS data D14 and captured image data from the camera 12 (step S115). At this time, the GPS data acquisition unit 21d may acquire the GPS data D14 from the camera 12, and the captured image acquisition unit 21e may acquire the captured image data from the camera 12. Alternatively, at this time, the captured image acquisition unit 21e may acquire the captured image data in which the GPS data D14 is embedded from the camera 12, and the GPS data acquisition unit 21d may acquire the GPS data D14 from the captured image data.

Next, the display control unit 21a of the data input device 11 displays the captured image data on the input screen 50 (see FIG. 7B) (step S120). In the example illustrated in FIG. 7B, the captured image 91 is displayed in the enlarged display field 81.

Next, the inspection data creation unit 21c of the data input device 11 specifies the position coordinates of the image capturing location of the camera 12 in the facility on the basis of the GPS data D14 (step S125).

Next, the inspection data creation unit 21c of the data input device 11 estimates, on the basis of the facility data D12, one or a plurality of facility candidates existing near the current position coordinates of the camera 12, one or a plurality of equipment candidates provided in each facility candidate, and one or a plurality of component candidates to be inspected of each equipment candidate. At this time, the inspection data creation unit 21c can acquire the facility name of each facility candidate, the equipment name of the equipment candidate, and the component name of the component candidate from the facility data D12. Then, the inspection data creation unit 21c displays facility candidates as options for selection in the facility input field 71 (see FIG. 7B) of the input screen 50 in a pull-down list in order of proximity to the position coordinates (step S130).

At this time, in the equipment input field 72, the equipment detail input field 73, the component input field 74, and the component detail input field 75 (see FIG. 7B), equipment candidates and component candidates of the facility candidate closest from the position coordinates may be displayed as options for selection in a pull-down list. However, depending on the operation, it is possible to configure these fields to display other facility candidates, or to configure these fields to display nothing.

The operator who sees the input screen 50 illustrated in FIG. 7B performs an operation of selecting the corresponding facility (facility to be inspected) from among the facility candidates displayed in a pull-down list in the facility input field 71. Returning to FIG. 6A, after step S130, the operation detection unit 21b of the data input device 11 detects the operation of selecting the facility by the operator (step S135). Then, the inspection data creation unit 21c determines whether or not there is registered image data D13 (see FIG. 2) acquired in the past of the selected facility (whether it is stored in advance in the storage unit 22) (step S140).

When it is determined in the determination of step S140 that there is registered image data D13 (in a case of "Yes"), the inspection data creation unit 21c compares the registered image data D13 with the captured image data (step S145). The comparison method is not particularly limited, and various methods can be used. For example, the comparison method can be performed by causing the data input device 11 or the like to learn a suitable technique in artificial intelligence (AI) learning.

Note that, when capturing an image of a facility with the camera 12, the operator mainly captures an image of a component to be inspected. Thus, the component to be inspected is almost at the center of the captured image data. Accordingly, when comparing the registered image data D13 with the captured image data in step S145, the inspection data creation unit 21c compares a component appearing at substantially the center of the captured image data with a component appearing at a corresponding portion in the registered image data D13. Thus, the inspection data creation unit 21c estimates an equipment candidate and a component candidate to be inspected, and, displays, as options for selections in a pull-down list, equipment data indicating the estimated equipment candidate and component data indicating the estimated component candidate in the equipment input field 72, the equipment detail input field 73, the component input field 74, and the component detail input field 75, on the basis of the facility data D12. Note that, in one or more embodiments, it is assumed that display contents of both the equipment input field 72 and the equipment detail input field 73 represent one equipment. Further, it is assumed that display contents of both the component input field 74 and the component detail input field 75 represent one component. Then, the inspection data creation unit 21c automatically inputs the facility candidate, the equipment candidate, and the component candidate displayed in the facility input field 71, the equipment input field 72, the equipment detail input field 73, the component input field 74, and the component detail input field 75 to the "facility name" field, the "equipment name" field, and the "component name" field of the temporarily registered inspection data D15 (see FIG. 5A) (step S150). Thereafter, the process proceeds to step S160 in FIG. 6B.

When it is determined in the determination of step S140 that there is no registered image data D13 described above (in a case of "No"), as illustrated in FIGS. 7C and 7D, the operator manually performs an operation of selecting the equipment and the component, and thus the operation detection unit 21b of the data input device 11 detects the operation of selecting the equipment and the component. Then, the inspection data creation unit 21c inputs the automatically selected facility candidate in the facility input field 71, the manually selected equipment, and the manually selected component to the "facility name" field, the "equipment name" field, and the "component name" field of the temporarily registered inspection data D15 (see FIG. 5A) (step S155). Thereafter, the process proceeds to step S160 in FIG. 6B.

After step S150 or step S155, the operator determines whether or not to change the image capturing distance of the camera 12 by viewing the captured image 91 (see FIG. 7E) appearing on the input screen 50, and if necessary, operates the distance setting operation field 55 (see FIG. 7E) to perform a distance setting operation.

As illustrated in FIG. 6B, when the operator has performed the distance setting operation, the operation detection unit 21b of the data input device 11 detects the distance setting operation (step S160). However, there may be a case where the distance setting operation is not performed. In that case, the process of step S160 is not performed, and a process of step S170 is performed.

After step S160, the operator presses the first inspection start button 57 (see FIG. 7F) or the second inspection start button 58 (see FIG. 7F) to perform an inspection starting operation. The operator presses the first inspection start button 57 (see FIG. 7F) when performing the initial inspection, or presses the second inspection start button 58 (see FIG. 7F) when performing the reinspection.

Returning to FIG. 6B, at this time, the operation detection unit 21b of the data input device 11 detects the inspection starting operation (step S165). Then, the operation detection unit 21b determines which operation has been performed (step S170).

When it is determined in the determination of step S170 that it is a pressing operation on the first inspection start button 57 (in the example illustrated in FIG. 7F, the button displayed as "Inspection Start"), the inspection data creation unit 21c of the data input device 11 temporarily registers that it is the first inspection in the "initial inspection/reinspection" field of the temporarily registered inspection data D15 (see FIG. 5A) (step S175).

On the other hand, when it is determined in the determination of step S170 that it is a pressing operation on the second inspection start button 58 (in the example illustrated in FIG. 7F, the button displayed as "Remonitoring Start"), the inspection data creation unit 21c of the data input device 11 temporarily registers that it is the reinspection in the "initial inspection/reinspection" field of the temporarily registered inspection data D15 (see FIG. 5A) (step S180).

After step S175 or step S180, the infrared image acquisition unit 21f of the data input device 11 acquires infrared image data from the camera 12 (step S185).

Next, the operator alternately displays the captured image 91 and the infrared image 92 in the enlarged display field 81 (see FIG. 7F), or displays the captured image 91 and the infrared image 92 by overlaying on the enlarged display field 81 (see FIG. 7F), so as to view the displayed image. Thus, the operator determines whether or not to adjust the position where the captured image 91 and the infrared image 92 are overlaid, and if necessary, operates the position adjustment operation field 56 (see FIG. 7F) to perform an adjustment operation of the position where the captured image 91 and the infrared image 92 are overlaid.

Returning to FIG. 6B, the operation detection unit 21b of the data input device 11 determines whether or not the adjustment operation of the position where the captured image 91 and the infrared image 92 are overlaid has been performed (step S190).

When it is determined, in the determination of step S190, that the position adjustment operation has been performed (in a case of "Yes"), the data input device 11 executes the position adjustment instructed by the operator (step S195). Thereafter, the process returns to step S185.

On the other hand, when it is determined, in the determination of step S190, that the position adjustment operation has not been performed (in a case of "No"), the image analysis unit 21g of the data input device 11 creates the above-described analysis images obtained by analyzing the situation of the facility on the basis of the infrared image 92. Then, the inspection data creation unit 21c (or the image analysis unit 21g or the display control unit 21a) displays the analysis images on the input screen 50 (see FIG. 7G) (step S200).

Figure 7D:
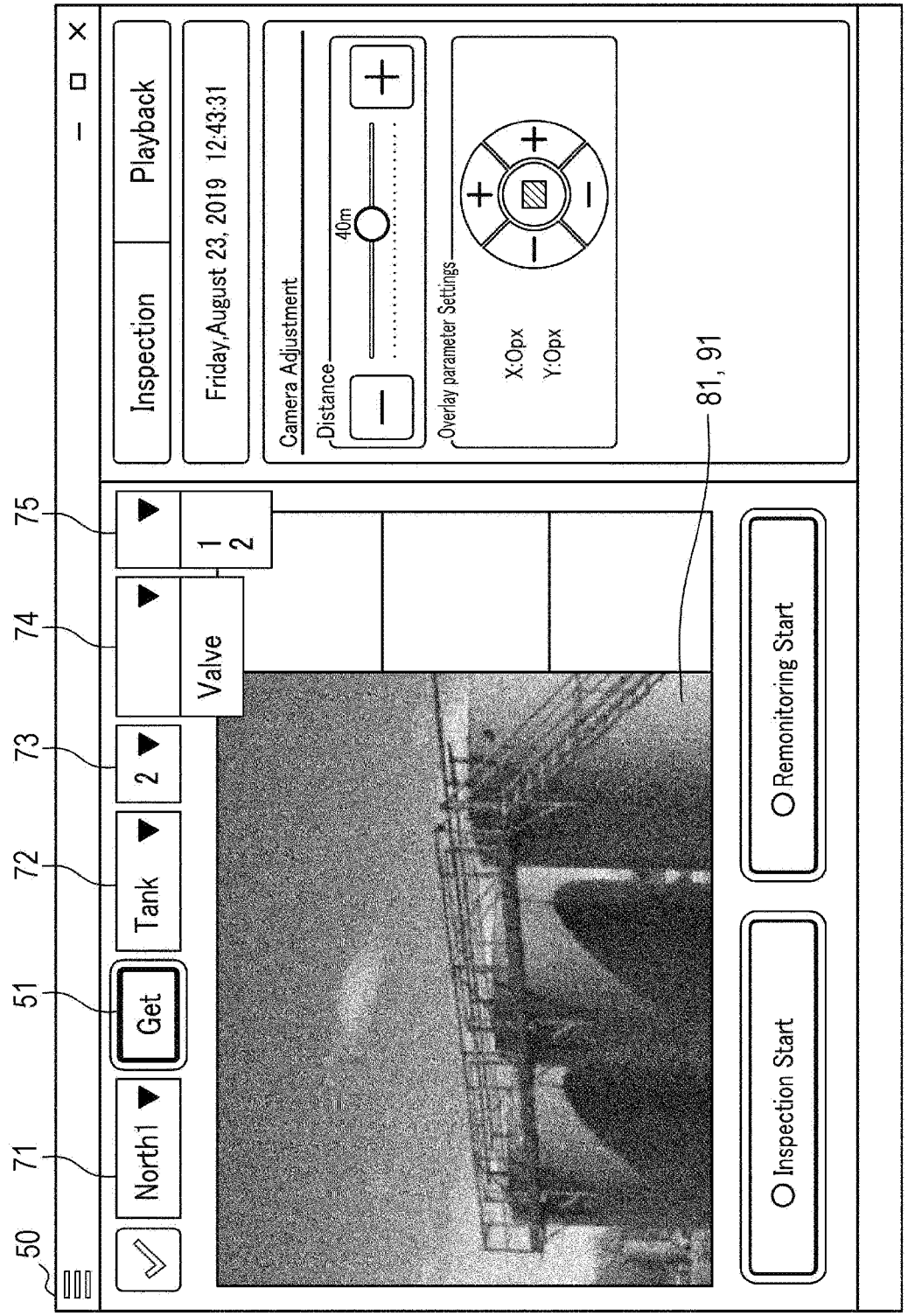
FIG. 7D is an explanatory diagram (4) illustrating a configuration of the input screen.
Figure 7E:
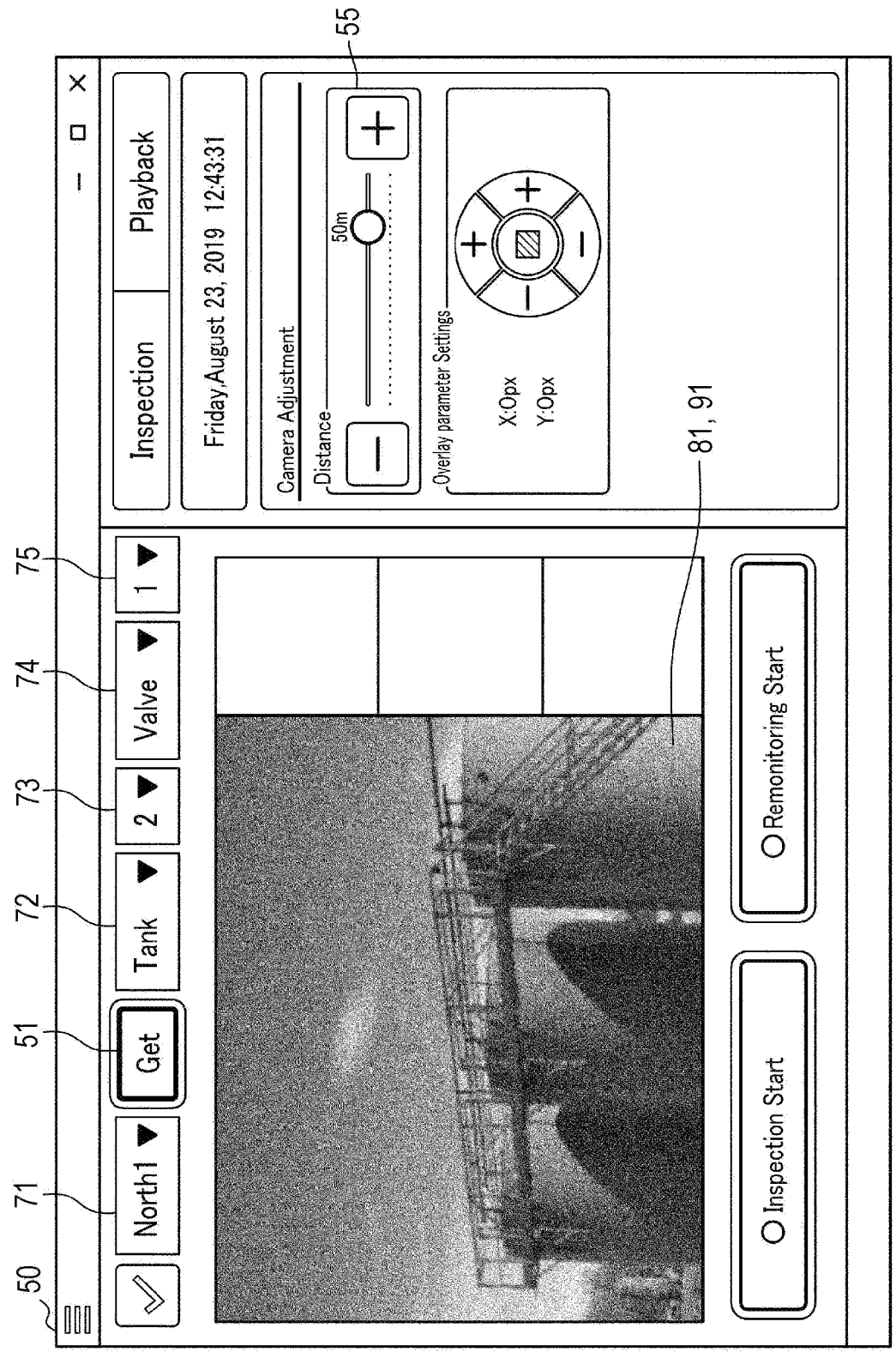
FIG. 7E is an explanatory diagram (5) illustrating a configuration of the input screen.
Figure 7F:
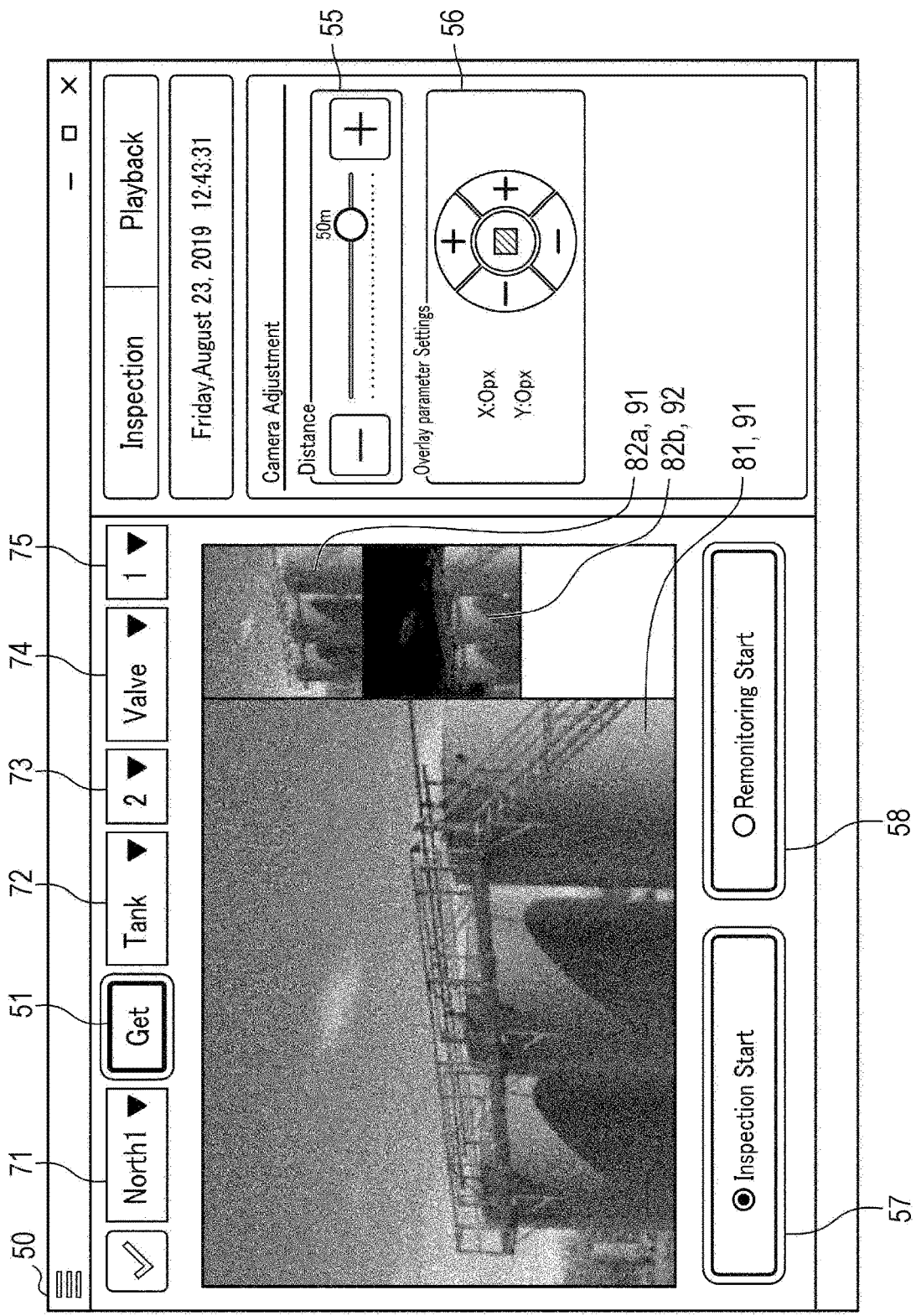
FIG. 7F is an explanatory diagram (6) illustrating a configuration of the input screen.

Note that, when displaying the analysis images on the input screen 50 in step S200, the display control unit 21a changes the input screen 50 from the configuration illustrated in FIG. 7F to the configuration illustrated in FIG. 7G, for example. In the example illustrated in FIG. 7G, the input screen 50 has a configuration in which a temperature distribution display field 59 is displayed instead of the distance setting operation field 55 and the position adjustment operation field 56 each illustrated in FIG. 7F. Further, the input screen 50 has a configuration in which a normal button 61, a leak button 62, and a stop button 63 are displayed instead of the first inspection start button 57 and the second inspection start button 58 each illustrated in FIG. 7F. The temperature distribution display field 59 indicates a color distribution of colors corresponding to the temperatures of the analysis images. The normal button 61 is a button pressed in a case of instructing the data input device 11 to end the inspection and when an abnormality (in one or more embodiment, gas leak) is not present in the facility. The leak button 62 is a button pressed in a case of instructing the data input device 11 to end the inspection and when an abnormality (in one or more embodiments, gas leak) is present in the facility. The stop button 63 is a button pressed in a case of instructing the data input device 11 to interrupt the inspection. Hereinafter, the normal button 61, the leak button 62, and the stop button 63 may be referred to as a "first end button", a "second end button", and an "interruption instruction button", respectively.

Then, the analysis images are displayed on the input screen 50. In the example illustrated in FIG. 7G, as the analysis images, the intermediate image 93, the temperature image 94, and the infrared-gas cloud superimposed image 95 are displayed in the reduced display fields 82a, 82b, and 82c, respectively, and the visible light-gas cloud superimposed image 96 is displayed in the enlarged display field 81. As described above, in one or more embodiments, the analysis images (in the example illustrated in FIG. 7G, the intermediate image 93, the temperature image 94, the infrared-gas cloud superimposed image 95, and the visible light-gas cloud superimposed image 96) are moving images. The data input device 11 generates various analysis images as moving images on the basis of the captured image (visible light moving image) and the infrared moving image of the facility captured by the camera 12, and displays the analysis images on the input screen 50 of the display unit 23.

The operator who sees the input screen 50 illustrated in FIG. 7G can easily determine the presence or absence of gas leak by identifying the presence or absence of gas fluctuation by viewing the various analysis images generated as moving images. Then, the operator presses any one of the normal button 61, the leak button 62, and the stop button 63 depending on the situation. Thus, the operator performs an interruption operation or an end operation of the inspection.

Returning to FIG. 6B, after step S200, the operation detection unit 21b of the data input device 11 detects the interruption operation or the end operation by the operator (step S205). Then, the operation detection unit 21b determines which operation has been performed (step S210).

When it is determined, in the determination of step S210, that it is a pressing operation on the stop button 63 (in the example illustrated in FIG. 7G, the button displayed as "Stop"), the inspection data creation unit 21c of the data input device 11 performs definitive registration with "interrupted" and "incomplete" (step S215). At this time, the inspection data creation unit 21c registers the inspection data of the facility registered in the temporarily registered inspection data D15 (see FIG. 5A) in the definitively registered inspection data D16 (see FIG. 5B). Then, the inspection data creation unit 21c automatically inputs data indicating "interrupted" and data indicating "incomplete" to the "presence or absence of leak" field and the "inspection completed/incomplete" field of the definitively registered inspection data D16 (see FIG. 5B). Thus, the input of data to the definitively registered inspection data D16 is completed. In this case, the worker continues the inspection later.

Further, when it is determined, in the determination of step S210, that it is a pressing operation on the leak button 62 (in the example illustrated in FIG. 7G, the button displayed as "LEAK"), the inspection data creation unit 21c of the data input device 11 performs the definitive registration with "leak present" and "incomplete" (step S220). At this time, the inspection data creation unit 21c registers the inspection data of the facility registered in the temporarily registered inspection data D15 (see FIG. 5A) in the definitively registered inspection data D16 (see FIG. 5B). Then, the inspection data creation unit 21c automatically inputs data indicating "leak present" and the data indicating "incomplete" to the "presence or absence of leak" field and the "inspection completed/incomplete" field of the definitively registered inspection data D16 (see FIG. 5B). Thus, the input of data to the definitively registered inspection data D16 is completed. In this case, the worker arranges another worker to repair the gas leak site. When another worker repairs the gas leak site, the worker reinspects the presence or absence of gas leak.

Further, when it is determined, in the determination of step S210, that it is a pressing operation on the normal button 61 (in the example illustrated in FIG. 7G, the button displayed as "NORMAL"), the inspection data creation unit 21c of the data input device 11 performs the definitive registration with "no leak" and "completed" (step S225). At this time, the inspection data creation unit 21c registers the inspection data of the facility registered in the temporarily registered inspection data D15 (see FIG. 5A) in the definitively registered inspection data D16 (see FIG. 5B). Then, the inspection data creation unit 21c automatically inputs data indicating "no leak" and data indicating "completed" to the "presence or absence of leak" field and the "inspection completed/incomplete" field of the definitively registered inspection data D16 (see FIG. 5B). Thus, the input of data to the definitively registered inspection data D16 is completed.

The data input device 11 ends the series of routine processes by performing the processes of step S215, step S220, or step S225. The inspection data of the facility input to the definitively registered inspection data D16 is transmitted to and stored in the support terminal 14 and the data server 15.

<Main Features of Data Input Device>

(1) As illustrated in FIG. 2, a data input device 11 according to one or more embodiments includes a display control unit 21a that creates various screens and displays the screens on a display unit 23, an inspection data creation unit 21c that creates inspection data (temporarily registered inspection data D15 and definitively registered inspection data D16) related to a gas inspection in a facility of either one or both of oil and gas, and a GPS data acquisition unit 21d (position data acquisition unit) that acquires GPS data D14 (position data) indicating position coordinates of the facility. The display control unit 21a creates an input screen 50 for creating the inspection data. The inspection data creation unit 21c estimates, on the basis of the GPS data D14, one or a plurality of facility candidates for which the inspection data is to be created, and displays the facility candidate or candidates as option(s) for selection on the input screen 50.

The data input device 11 according to one or more embodiments as described above can automatically input facility candidates on the input screen 50 for creating the inspection record (inspection form). Thus, the data input device 11 can reduce the burden on the operator when inputting data.

(2) The inspection data creation unit 21c of the data input device 11 according to one or more embodiments estimates one or a plurality of facility candidates existing near position coordinates indicated by the GPS data D14. Then, the inspection data creation unit 21c may display the facility candidates as options for selection on the input screen 50 in order of proximity to the position coordinates (see step S130 and FIG. 7B in FIG. 6A).

The data input device 11 according to one or more embodiments as described above can narrow down the facility candidates having high applicability by estimating the facility candidates existing near the position coordinates indicated by the GPS data D14, and can display the facility candidates as options for selection on the input screen 50 in order of proximity to the position coordinates. Thus, the operator can select a facility having high applicability on the input screen 50. Thus, the data input device 11 can further reduce the burden on the operator when inputting data.

(3) As illustrated in FIG. 7A, the data input device 11 according to one or more embodiments further includes a captured image acquisition unit 21e that acquires a captured image in which the facility is captured. The display control unit 21a creates, as the input screen 50, a screen including a first input field (facility input field 71) for inputting the facility candidate, a second input field (equipment input field 72) for inputting an equipment candidate provided in the facility candidate, and a third input field (component input field 74) for inputting a component candidate provided in the equipment candidate. The inspection data creation unit 21c may estimate, on the basis of facility data D12 prepared in advance, one or a plurality of the equipment candidates provided in each facility candidate and one or a plurality of the component candidates provided in each equipment candidate, and display, as options for selection, each facility candidate, each equipment candidate, and each component candidate in the first input field (facility input field 71), the second input field (equipment input field 72), and the third input field (component input field 74) corresponding thereto, respectively (see FIGS. 7B to 7D).

The data input device 11 according to one or more embodiments as described above can estimate the equipment candidate and the component candidate having high applicability and display, as options for selection, the equipment candidate and the component candidate on the input screen 50. Thus, the operator can select the equipment candidate and the component candidate having high applicability on the input screen 50. Thus, the data input device 11 can further reduce the burden on the operator when inputting data.

(4) The inspection data creation unit 21c of the data input device 11 according to one or more embodiments may estimate the component candidate by comparing a registered image (registered image data D13) acquired in the past with the captured image 91 (see steps S145 and S150 in FIG. 6A).

The data input device 11 according to one or more embodiments as described above can narrow down the component candidates having high applicability by comparing the registered image (registered image data D13) acquired in the past with the captured image 91. Thus, the data input device 11 can further reduce the burden on the operator when inputting data.

(5) As illustrated in FIG. 2, the data input device 11 according to one or more embodiments further includes the infrared image acquisition unit 21f that acquires an infrared image 92 of the facility, and an image analysis unit 21g that creates an analysis image obtained by analyzing a situation of the facility on the basis of the infrared image 92. As illustrated in FIG. 7G, the inspection data creation unit 21c may display the captured image 91, the infrared image 92, and the analysis image (intermediate image 93, temperature image 94, infrared-gas cloud superimposed image 95, visible light-gas cloud superimposed image 96) on the input screen 50.

The data input device 11 according to one or more embodiments as described above displays the captured image 91, the infrared image 92, and the analysis image on the input screen 50, thereby allowing the operator to easily grasp the situation of the facility. Thus, the data input device 11 can further reduce the burden on the operator when inputting data.

(6) As illustrated in FIG. 7A, the display control unit 21a of the data input device 11 according to one or more embodiments creates, as the input screen 50, a screen including a plurality of reduced display fields 82a, 82b, and 82c in which reduced images are displayed and at least one enlarged display field 81 in which an enlarged image is displayed. Then, as illustrated in FIG. 7G, the display control unit 21a may display the captured image 91, the infrared image 92, and the analysis image in the reduced display fields 82a, 82b, and 82c, respectively, and displays an image freely selected from among the images displayed in the respective reduced display fields 82a, 82b, and 82c in the enlarged display field 81.

The data input device 11 according to one or more embodiments as described above can improve the visibility of each image by displaying the image freely selected from among the images displayed in the respective reduced display fields 82a, 82b, and 82c in the enlarged display field 81. Thus, the operator can accurately grasp the situation of the facility. Therefore, the data input device 11 can improve accuracy of the inspection.

(7) As illustrated in FIG. 7F, the display control unit 21a of the data input device 11 according to one or more embodiments may create, as the input screen 50, a screen including a first inspection start button 57 for an initial inspection and a second inspection start button 58 for a reinspection as inspection start buttons that instruct start of an inspection accompanied by creation of the analysis image.

The data input device 11 according to one or more embodiments as described above can receive two types of instructions, one is for a mode setting of the initial inspection or the reinspection and the other is for an inspection start, by one action by providing two types of inspection start buttons, the first inspection start button 57 and the second inspection start button 58. Thus, the data input device 11 can improve operability and reduce the burden on the operator.

(8) As illustrated in FIG. 7G, when either one of the first inspection start button 57 and the second inspection start button 58 is pressed, the display control unit 21a of the data input device 11 according to one or more embodiments displays a first end button (normal button 61) pressed when an abnormality is not present in the facility and a second end button (leak button 62) pressed when an abnormality is present in the facility on the input screen 50 at any timing. When at least the second end button (leak button 62) is pressed, the inspection data creation unit 21c may store any one or a plurality of images among the captured image 91, the infrared image 92, and the analysis image in a storage unit 22 in association with the inspection data.

The data input device 11 according to one or more embodiments as described above can reliably store an image serving as evidence only by pressing the second end button (leak button 62) when an abnormality (for example, gas leak) is present in the facility. Thus, the data input device 11 can secure an evidence capability of the inspection.

(9) As illustrated in FIGS. 7A and 7E, the display control unit 21a of the data input device 11 according to one or more embodiments may create, as the input screen 50, a screen including a distance setting operation field 55 for performing an operation of setting an image capturing distance.

The data input device 11 according to one or more embodiments as described above can set the image capturing distance by operating the distance setting operation field 55. Thus, the data input device 11 can easily capture images at various distances.

(10) As illustrated in FIGS. 7A and 7F, the display control unit 21a of the data input device 11 according to one or more embodiments may create, as the input screen 50, a screen including the position adjustment operation field 56 for performing an adjustment operation of a position where the captured image 91 and the infrared image 92 are overlaid.

The data input device 11 according to one or more embodiments as described above can adjust the position where the captured image 91 and the infrared image 92 are overlaid by operating the position adjustment operation field 56. Thus, when an abnormality (for example, gas leak) is present, the data input device 11 can easily identify a site where the abnormality is present in the facility. Consequently, the data input device 11 can improve the accuracy of the inspection.

As described above, the data input device 11 according to one or more embodiments can reduce the burden on the operator when inputting data.

Note that the present invention is not limited to the above-described embodiments, and various changes and modifications can be made without departing from the gist of the present invention.

For example, the above-described embodiments have been described in detail for easy understanding of the gist of the present invention. Thus, the present invention is not necessarily limited to one including all the components described. Further, in the present invention, another component can be added to a certain component, or a part of the components can be changed to other components. Further, in the present invention, a part of components can be eliminated.

Furthermore, for example, the procedure of the processing is not limited to those illustrated in FIGS. 6A and 6B. For example, depending on the operation, the data input device 11 can employ a procedure of simultaneously capturing and acquiring the visible light image and the infrared image.

Further, for example, the camera 12 and the data input device 11 can acquire position coordinate data from a satellite of a system other than the GPS. Examples of the system other than the GPS include "Michibiki" which is the Quasi-Zenith Satellite System of Japan, and the like.

Further, for example, the data input device 11 may allow the operator to directly input characters, numbers, and the like into the inspection location input field 70 (see FIG. 7A) of the input screen 50. For example, it is assumed that the input screen 50 has a configuration in which blank data (not illustrated) can be selected when a facility candidate, an equipment candidate, a component candidate, or the like is selected in the inspection location input field 70 (see FIG. 7A). Then, when the operator selects blank data in the inspection location input field 70, the data input device 11 displays a keyboard screen, a numeric keypad screen, or the like as an interrupt screen of the input screen 50. The operator who sees this inputs characters, numbers, and the like by operating the keyboard screen or the numeric keypad screen. Then, the data input device 11 displays the input characters, numbers, and the like in the field where the blank data is input in the inspection location input field 70. In this manner, the operator can directly input characters, numbers, and the like into the inspection location input field 70 of the input screen 50.

Further, for example, the data input device 11 may allow the operator to change the contents of the temporarily registered inspection data D15 and the definitively registered inspection data D16. For example, the data input device 11 prepares a read screen (not illustrated) for reading the temporarily registered inspection data D15 and the definitively registered inspection data D16 in advance. The operator operates the data input device 11 to display a read screen (not illustrated) on the display unit 23. Then, the operator reads the temporarily registered inspection data D15 and the definitively registered inspection data D16 from the read screen (not illustrated), and changes contents of the temporarily registered inspection data D15 and the definitively registered inspection data D16. Then, the data input device 11 stores the temporarily registered inspection data D15 and the definitively registered inspection data D16 in the storage unit 22 with the changed contents. In this manner, the operator can change the contents of the temporarily registered inspection data D15 and the definitively registered inspection data D16.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 Data input system
11 Data input device (mobile terminal)
12 Camera
13 USB memory (storage medium)
14 Support terminal
15 Data server
21 Control unit
21a Display control unit
21b Operation detection unit
21c Inspection data creation unit
21d GPS data acquisition unit (position data acquisition unit)
21e Captured image acquisition unit
21f Infrared image acquisition unit
21g Image analysis unit
22 Storage unit
23 Display unit (touch panel display)
31 Visible light camera
32 Infrared camera
33 GPS circuit
50 Input screen
51 Acquisition button
52 Image capturing mode button
53 Reproduction mode button
54 Date display field
55 Distance setting operation field
56 Position adjustment operation field
57 First inspection start button
58 Second inspection start button
59 Temperature distribution display field
61 Normal button (first end button)
62 Leak button (second end button)
63 Stop button "interruption instruction button"

70 Inspection location input field
71 Facility input field (first input field)
72 Equipment input field (second input field)
73 Equipment detail input field
74 Component input field (third input field)
75 Component detail input field
80 Image display field
81 Enlarged display field
82a Reduced display field
82b Reduced display field
82c Reduced display field
91 Captured image
92 Infrared image
93 Intermediate image (analysis image)
94 Temperature image (analysis image)
95 Infrared-gas cloud superimposed image (analysis image)
96 Visible light-gas cloud superimposed image (analysis image)
D11 Inspection item data
D12 Facility data
D13 Registered image data
D14 GPS data (position data)
D15 Temporarily registered inspection data
D16 definitively registered inspection data
Pr Control instructions

The invention claimed is:

1. A data input device comprising:
a controller that:
   acquires position data indicating position coordinates of a facility,
   estimates, based on the position data, one or more facility candidates,
   causes a display to display an input screen showing the estimated one or more facility candidates as options for selection by a user,
   creates inspection data relating to gas inspection of the one or more facility candidates selected by the user,
   estimates, based on facility data prepared in advance, one or more equipment candidates provided in each of the one or more facility candidates and one or more component candidates provided in each of the one or more equipment candidates, and
   causes the display to display the input screen including a first input field showing the estimated one or more facility candidates, a second input field showing the estimated one or more equipment candidates, and a third input field showing the estimated one or more component candidates as options for selection by the user.

2. The data input device according to claim 1, wherein the controller:
   estimates the one or more facility candidates existing near the position coordinates, and
   causes the display to display the input screen showing the estimated one or more facility candidates in order of proximity to the position coordinates as options for selection by the user.

3. The data input device according to claim 1, wherein the controller:
   acquires a captured image of the facility.

4. The data input device according to claim 3, wherein the controller estimates the one or more component candidates by comparing a registered image acquired in past with the captured image.

5. The data input device according to claim 3, wherein the controller:
   acquires an infrared image of the facility,
   creates an analysis image obtained by analyzing a situation of the facility based on the infrared image, and
   causes the display to display the input screen showing the captured image, the infrared image, and the analysis image.

6. The data input device according to claim 5, wherein the controller causes the display to display the input screen including:
   reduced display fields showing the captured image, the infrared image, and the analysis image as a reduced image, and
   an enlarge display field showing an image selected from the captured image, the infrared image, and the analysis image in the reduced display fields, as an enlarged image.

7. The data input device according to claim 5, wherein the controller creates the input screen including a first inspection start button for an initial inspection and a second inspection start button for a reinspection to instruct start of an inspection accompanied by creation of the analysis image.

8. The data input device according to claim 7, wherein the controller:
   when the first inspection start button or the second inspection start button is pressed, causes the display to display the input screen showing a first end button that is pressed when an abnormality is not present in the facility and a second end button that is pressed when an abnormality is present in the facility at any timing, and
   when the second end button is pressed, stores at least one of the captured image, the infrared image, or the analysis image in a storage in association with the inspection data.

9. The data input device according to claim 5, wherein the controller creates the input screen including a position adjustment operation field to adjust a position where the captured image and the infrared image are overlaid.

10. The data input device according to claim 3, wherein the controller creates the input screen including a distance setting operation field to set an image capturing distance.

11. A non-transitory computer-readable medium storing instructions which, when executed by a computer, cause the computer to perform a method comprising:
   acquiring position data indicating position coordinates of a facility;
   estimating, based on the position data, one or more facility candidates; and
   displaying an input screen showing the estimated one or more facility candidates as options for selection by a user,
   creating inspection data relating to gas inspection of the one or more facility candidates selected by the user,
   estimating, based on facility data prepared in advance, one or more equipment candidates provided in each of the one or more facility candidates and one or more component candidates provided in each of the one or more equipment candidates, and
   displaying the input screen including a first input field showing the estimated one or more facility candidates, a second input field showing the estimated one or more equipment candidates, and a third input field showing the estimated one or more component candidates as options for selection by the user.

12. The non-transitory computer-readable medium according to claim 11, wherein the method further comprises:

estimating the one or more facility candidates existing around the position coordinates, and displaying the input screen showing the estimated one or more facility candidates in order of proximity to the position coordinates as options for selection by the user.

13. The non-transitory computer-readable medium according to claim 11, wherein the method further comprises:

acquiring a captured image of the facility.

14. The non-transitory computer-readable medium according to claim 13, wherein the method further comprises estimating the one or more component candidates by comparing a registered image acquired in past with the captured image.

15. The non-transitory computer-readable medium according to claim 13, the method further comprises:

acquiring an infrared image of the facility;

creating an analysis image obtained by analyzing a situation of the facility based on the infrared image, and displaying the input screen showing the captured image, the infrared image, and the analysis image.

16. The non-transitory computer-readable medium according to claim 15, wherein the method further comprises displaying the input screen including:

reduced display fields showing the captured image, the infrared image, and the analysis image as a reduced image, and an enlarge display field showing an image selected from the captured image, the infrared image, and the analysis image in the reduced display fields, as an enlarged image.

17. The non-transitory computer-readable medium according to claim 15, wherein the method further comprises creating the input screen including a first inspection start button for an initial inspection and a second inspection start button for a reinspection to instruct start of an inspection accompanied by creation of the analysis image.

18. The non-transitory computer-readable medium according to claim 17, wherein the method further comprises:

when the first inspection start button or the second inspection start button is pressed, displaying the input screen showing a first end button that is pressed when an abnormality is not present in the facility and a second end button that is pressed when an abnormality is present in the facility at any timing; and when the second end button is pressed, storing at least one of the captured image, the infrared image, or the analysis image in a storage in association with the inspection data.

19. The non-transitory computer-readable medium according to claim 15, wherein the method further comprises creating the input screen including a position adjustment operation field to adjust a position where the captured image and the infrared image are overlaid.

20. The non-transitory computer-readable medium according to claim 13, wherein the method further comprises creating the input screen including a distance setting operation field to set an image capturing distance.

* * * * *